US010834931B2

(12) United States Patent
Baechtle et al.

(10) Patent No.: US 10,834,931 B2
(45) Date of Patent: Nov. 17, 2020

(54) HANGING DEVICE AND METHOD FOR EXTRACTION OF A SAUSAGE GROUP

(71) Applicant: Albert Handtmann Maschinenfabrik GmbH & Co. KG, Biberach (DE)

(72) Inventors: Manfred Baechtle, Schemmerhofen (DE); Florian Osswald, Ulm (DE); Siegfried Reutter, Eberhardzell (DE); Gerhard Mueller, Schemmerhofen (DE); Gerhard Schliesser, Wain (DE); Jochen Merk, Ochsenhausen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 463 days.

(21) Appl. No.: 15/807,321

(22) Filed: Nov. 8, 2017

(65) Prior Publication Data
US 2018/0125082 A1  May 10, 2018

(30) Foreign Application Priority Data

Nov. 8, 2016  (EP) ................................. EP16197668

(51) Int. Cl.
A22C 15/00  (2006.01)
(52) U.S. Cl.
CPC .......... *A22C 15/007* (2013.01); *A22C 15/001* (2013.01); *A22C 15/002* (2013.01)
(58) Field of Classification Search
CPC ..... A22C 15/00; A22C 15/001; A22C 15/002; A22C 15/007
USPC ........... 452/21–26, 30–32, 35–37, 46–48, 51
See application file for complete search history.

(56) References Cited

U.S. PATENT DOCUMENTS

| 5,163,864 | A | 11/1992 | Burger et al. | |
|---|---|---|---|---|
| 6,592,452 | B1 * | 7/2003 | Myers | A22C 11/00 452/51 |
| 7,160,184 | B1 * | 1/2007 | Lebsack | A22C 15/002 452/177 |
| 7,735,630 | B2 * | 6/2010 | Borkiewicz | A22C 15/001 198/465.4 |
| 8,151,973 | B2 * | 4/2012 | Borkiewicz | A22C 15/001 198/465.4 |
| 8,708,783 | B2 * | 4/2014 | Tamaki | A22C 11/00 452/51 |
| 2003/0096568 | A1 | 5/2003 | Kasai | |

(Continued)

FOREIGN PATENT DOCUMENTS

| CN | 101292674 A | 10/2008 |
|---|---|---|
| CN | 103564030 A | 2/2014 |

(Continued)

OTHER PUBLICATIONS

China National Intellectual Property Administration, Office Action and Search Report Issued in Application No. 201711090696.1, dated Jul. 31, 2019, 19 pages.

(Continued)

*Primary Examiner* — Richard T Price, Jr.
(74) *Attorney, Agent, or Firm* — McCoy Russell LLP (57) ABSTRACT

The present disclosure relates to a hanging device, a smoke bar top module as well as a method for extracting a sausage group that hangs on multiple hanging hooks of a hanging device. The hanging hooks have a device for guiding a smoke bar or a smoke bar top module.

13 Claims, 10 Drawing Sheets

(56) References Cited

U.S. PATENT DOCUMENTS

| | | | |
|---|---|---|---|
| 2010/0243409 | A1 | 9/2010 | Borkiewicz et al. |
| 2011/0053481 | A1 | 3/2011 | Nakamura et al. |
| 2013/0280996 | A1 | 10/2013 | Bachtle |
| 2014/0073231 | A1 | 3/2014 | Fischer et al. |

FOREIGN PATENT DOCUMENTS

| | | | |
|---|---|---|---|
| DE | 9014610 | U1 | 6/1991 |
| EP | 1915910 | A1 | 4/2008 |
| EP | 1985183 | A1 | 10/2008 |
| EP | 1985184 | A1 | 10/2008 |
| EP | 2689665 | A1 | 1/2014 |
| EP | 2692236 | A1 | 2/2014 |
| JP | 2003180239 | A2 | 7/2003 |

OTHER PUBLICATIONS

Japan Patent Office, Office Action Issued in Application No. 2017-214859, dated Oct. 2, 2018, 7 pages.

\* cited by examiner

HANGING DEVICE AND METHOD FOR EXTRACTION OF A SAUSAGE GROUP

CROSS-REFERENCE TO RELATED APPLICATIONS

The present application claims priority to European Patent Application No. 16197668.3, entitled "HANGING DEVICE AND METHOD FOR EXTRACTION OF A SAUSAGE GROUP," filed on Nov. 8, 2016, the entire contents of which are hereby incorporated by reference for all purposes.

TECHNICAL FIELD

The present disclosure relates to a hanging device for hanging sausages according to the generic term of claim 1 as well as a method for extraction of a sausage group.

BACKGROUND AND SUMMARY

Figure 2A:
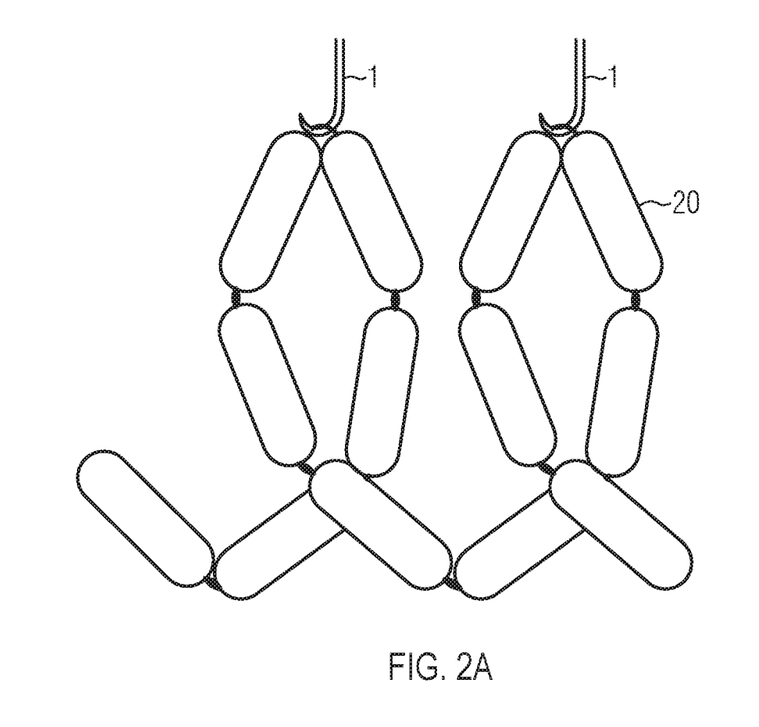
FIG. 2A shows a sausage chain hung in loops.
Figure 2B:
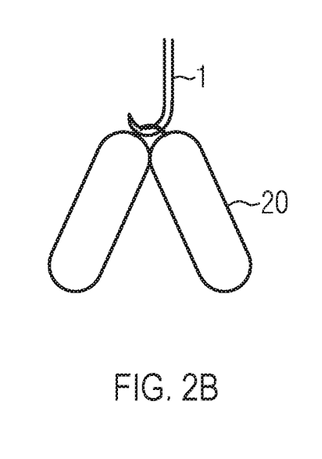
FIG. 2B shows sausages that are input on the hook in pairs at a dividing point.
Figure 2C:
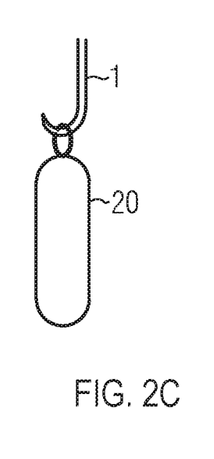
FIG. 2C schematically displays a sausage portion on a loop on a hook.

During production of sausages and/or sausage products by means of filling and positioning systems, sausage skins, e.g. natural, artificial or collagen bowels, are filled with a pasty mass by means of a filling machine, in particular a vacuum-filling machine. By the filled bowel being turned off, a sausage chain is formed of connected individual sausages and/or portions in the turn-off line. During handover of the sausage chain to a hanging device, predetermined dividing points are grabbed by hooks so that multiple sausage loops are formed of the sausage chain on the hanging device (see for example FIG. 2A). Such a loop consists of multiple sausages (3-Loop, 4-Loop, in FIG. 2A 6-Loop). It is also possible to hang the sausages in pairs in appropriate loops (FIG. 2B) or to hang individual sausages for example at a loop on a hook (FIG. 2C).

Figure 3:
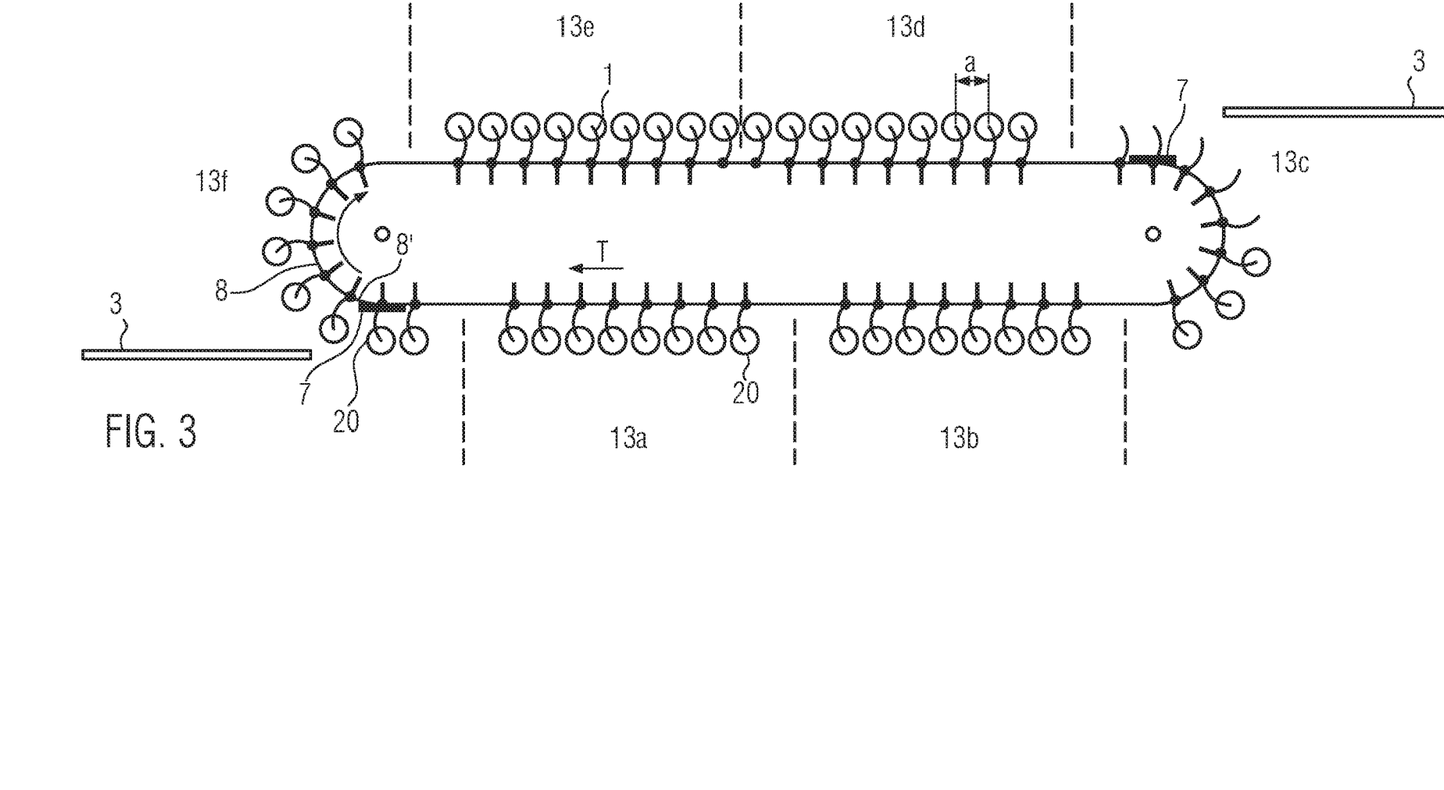
FIG. 3 shows a top view onto a hanging device according to the present disclosure.

In this context, multiple hooks with the respective sausages can be grouped in so-called sausage groups as can for example be seen in FIG. 3. When taking the sausage out of the hanging device, a smoke bar is inserted (threaded) into the sausage loops of a group and subsequently the smoke bar, on which the sausage loops were hung, is taken out of the hooks for further processing. The common geometrical designs of a smoke bar are round, V-shaped or star-shaped, without major bevels or pointy ends. The length is in an area of approximately 1000 mm up to 1500 mm. For the operator, it is difficult to thread the long smoke bar with its free ends correctly into the sausage loops. Hence, the operator needs much time for threading the smoke bar and it cannot be excluded that products are damaged. Threading with one hand is hardly possible. Due to the length of the smoke bar, it is also difficult to insert the smoke bar essentially horizontally into the hanging device because the smoke bar is not held on its end that faces away from the operator.

The larger the spreading of the sausages on the hook, the easier it is to insert the smoke bar. The fuller a natural bowel is packed, the stronger will be the spreading due to the curvature of the natural bowels. However, not exclusively packed products are manufactured and in particular in case of artificial or collagen bowels there is no curvature so that threading into the sausage loops is extremely difficult.

Attempts have already been made to adapt the geometry of the hook points in such a way that there will be a largest possible spreading of the sausage loops due to fitting of the left and right portion on the hook point. The wider the hook point, the larger is also the spreading. The larger the spreading, however, the more difficult will become the product output from the hook because the distance between the hook points is low. A larger hook distance could be the solution here, but said distance has a negative influence on the hanging density of the smoke bar and hence on the utilization of the subsequent installations.

Further, attempts have been made to achieve that the central position of the loop is in a nearly horizontal alignment due to an uneven number of portions per loop, e.g. 5-Loop. Hence, there will automatically be a larger spreading between the remaining portions. However, a respective method is not possible in case of an even number of portions per loop. Also hanging in pairs is not possible.

Taking this as a starting point, the present disclosure is based on the problem of providing a hanging device and a method that facilitate inserting of the smoke bar into the hanging device.

According to the present disclosure, a hanging device for hanging sausages, in particular sausage chains, is provided with multiple circulating hanging hooks. The hanging hooks have a guiding device for guiding of a smoke bar or a smoke bar top module (smoke bar attachment) against the movement direction T of the hanging hooks. This means that the smoke bar or rather a smoke bar top module, which can be placed onto the front end of the smoke bar, are connected to the hanging hooks through the guiding device, i.e. that the smoke bar or the smoke bar top module only have to be threaded into the guiding device of the hanging hooks with one guiding section of a smoke bar or of a smoke bar top module guiding device and therefore can be moved into the sausage group in the accurately right position. This means that the smoke bar can, in spite of its length, be grabbed on only one end and moved safely into the loops in the opposite direction to the movement direction of the hanging hooks. In this process, the guiding device also carries a part of the weight of the smoke bar, which leads to an essential workload reduction for the operating staff as well. If a smoke bar top module is used, said module can already be inserted for example into the guiding devices of the individual hanging hooks, wherein the operator only has to insert the smoke bar into the rear end of the hanging hook (viewed in the transport direction T), wherein the guiding device carries the smoke bar. Then, the operator will only have to hold the smoke bar with one hand and can insert said smoke bar into the sausage group. The sausage loops can subsequently be taken out without the influence of a larger spreading. The present disclosure enables safe inserting of a smoke bar into a sausage group and/or sausage loop regardless of the spreading, i.e. regardless of the firmness of the filled sausages, the bowel type, the smoke bar geometry of the caliber and regardless of the skillfulness of the operator.

In addition, the present disclosure enables an improved smoke bar utilization and threading in a very short time period. Furthermore, the present disclosure can prevent products from being damaged by the smoke bar. Generally speaking, the present disclosure leads to a significant performance increase and improved production safety.

In one example, the guiding devices of the hooks are formed in such a way that the smoke bar or the smoke bar top module is installed in an axially flexible way in the guiding devices. Hence, the smoke bar can be guided accurately in the sausage loops under the hooks. In this process, the hanging hooks can in one example comprise a groove, i.e. a recess, as a guiding device in which a guiding section, e.g. in form of a protrusion of the smoke bar or of the smoke bar top module, extends. But it is also possible that the hanging hooks as guiding devices comprise a protrusion that extends in a groove and/or recess in the smoke bar or smoke bar top module. It is only relevant that the smoke bar and/or smoke bar top module and the hanging hooks can be moved in relation to one another in the axial direction.

In this context, the smoke bar or the smoke bar top module can also be carried by the guiding devices, e.g., held against gravity. This can occur for example by means of magnetic force, e.g., in a way that at least the guiding device of the hanging hooks and/or the guiding device, e.g., the guiding section of the smoke bar or of the smoke bar top module, are formed magnetically. The smoke bar or smoke bar top module, however, can also be held by the contour of the guiding device that has areas that extend laterally, e.g., with a horizontal direction component, to the guiding direction and that carry the smoke bar or smoke bar top module against gravity. The guiding contour thereby has for example a cross-section that is wider in the upper area than in a lower area and that is for example essentially T-shaped or keyhole-shaped. The smoke bar or smoke bar top module, however, can also be held by a pressure piece or a spring element in a recess of the guiding device. Regardless of the actual embodiment, is only relevant that the guiding device of the hooks and of the smoke bar and/or smoke bar top module guides the smoke bar or smoke bar top module and also holds said smoke bar or smoke bar top module against gravity.

If the smoke bar top module is inserted in the guiding devices of the hooks, it can remain in the hanging device and be moved closely behind an end of a sausage group by the smoke bar during threading of the smoke bar after which the loaded smoke bar can be taken out. The smoke bar top module remains in the hanging device and will then run together with the hooks in the movement direction of the hooks in the direction of the deflection radius of the hanging device. To avoid destruction of the smoke bar top module, an end stop, which stops the smoke bar top module, is provided ahead of the deflection radius. As a relative movement of the smoke bar top module and the hanging hooks by the guiding devices is possible, the smoke bar top module remains in this position while the hanging hooks can continue to move. Then, the smoke bar top module can be displaced from a next smoke bar in the opposite direction to the movement direction of the hanging hooks. It is possible that a respective end stop is provided on both longitudinal sides of the hanging device when sausage groups are to be taken out on both sides.

As described before, either the smoke bar itself can be guided in the guiding device of the hooks, which already leads to a substantial facilitation. After having been inserted in the sausage group, the smoke bar can then be taken out of the guiding, for example when the smoke bar is moved away from the guiding against the holding force, e.g. of a magnet. In one example, however, a smoke bar top module is provided. The smoke bar top module has a connecting device, in particular a recess for axial inserting and extracting of the smoke bar. The smoke bar top module thereby has a guiding device and/or guiding section that interacts with the guiding device of the hanging hooks so that the smoke bar top module can be moved in the opposite direction to the movement direction of the inserting hooks. The smoke bar can therefore be moved axially into the connecting device of the smoke bar top module in a simple way and is carried in this way by the smoke bar top module and the guiding device of the hooks. The smoke bar can also be pulled back out of the connection device, for example for extraction of the smoke bar, in a simple way. The smoke bar top module consequently forms a one-sided smoke bar mounting.

The guiding device of the smoke bar top module can either comprise a protrusion that can run in a groove of the hanging hooks or a groove in which a protrusion of the hooks can run. A respective design can be implemented in a particularly easy and cost-efficient manner.

The smoke bar top module may comprise a point on its end that is located opposite to the recess, wherein the point end may be an eccentric point and wherein in particular the position of the point is adjustable in relation to the central axis of the smoke bar top module. By means of the point, the smoke bar top module can be inserted particularly easily in the sausage loops. Due to the position of the point being modifiable, the point can be aligned exactly to the center of the loop.

The connection device of the smoke bar top module comprises an end stop that is hit by the smoke bar during inserting and/or sliding in such a way that the smoke bar top module can be moved by the smoke bar.

In one example, the diameter of the recess is larger than the diameter of the smoke bar so that the smoke bar can be moved back, e.g., in the movement direction T of the hanging hooks, in a simple way for discharge in order to be subsequently moved out of the hanging device. If the connecting device, in particular the recess, is formed as a half shell, e.g., if it has for example an opening on its upper and/or lateral area, the smoke bar can be moved out of the smoke bar top module laterally and/or in an upward direction without having to be moved back out of the recess in the movement direction of the hanging hooks.

The smoke bar top module can remain in the hanging device, e.g., hanging on the hook, if multiple sausage groups are extracted successively. This comes with the advantage that there is no loose part that can get lost and that there is no need for threading a new smoke bar or a respective smoke bar top module into the guiding devices of the hanging hooks for each sausage group to be extracted. In contrast to this, only one new smoke bar has to be docked on the smoke bar top module and/or threaded in.

The present disclosure also relates to a method for extracting a sausage group that hangs on multiple hanging hooks of a hanging device with the following steps:

inserting a smoke bar into a sausage group, in particular into a sausage loop,     moving the smoke bar in an opposite direction to the movement direction of the input hooks up to the end of the sausage group, wherein the smoke bar and/or a smoke bar top module, which is connected to the smoke bar on its front end, is guided in a guiding device of the input hooks and     extracting the smoke bar that is loaded with sausages.

It is noted that reference to input hooks may refer to hanging hooks, in at least one example. As explained before, the method according to the present disclosure enables a particularly simple and efficient extraction of sausage groups. In this context, sausage loops shall be understood, as described before, as sausage chains that are hung on hooks in loops or rather individual sausages on a loop, wherein the loops can also be open towards the bottom. The term "up to the end" shall mean that the smoke bar is moved at least beyond the last hook of the sausage group to be extracted, for example.

It may be advantageous when the smoke bar top module is already inserted in the guiding devices of the input hooks and subsequently the smoke bar is inserted in the connecting devices of the smoke bar top module and the smoke bar top module is pushed in an opposite direction to the movement direction of the input hooks beyond the end of the sausage group to be input before the smoke bar loaded with sausages is extracted. Therefore, the smoke bar top module does not have to be threaded into the guidings for this purpose only. The smoke bar only has to be pushed into the connecting devices, for example the recess of the smoke bar top module, which can be done very easily and fast. Then, the smoke bar and the smoke bar top module will drive jointly up to the sausage group end in a direction that is opposite to the movement direction of the input hooks.

According to an embodiment, the smoke bar is moved away from the smoke bar top module, e.g., out of the recess, in the movement direction of the input hooks prior to the extraction of the smoke bar that is loaded with sausages. Then, the smoke bar is free and can be taken out of the device. Alternatively or in addition, the smoke bar can also be moved out of an opening in the lateral or upper area of the connecting device.

After the extraction of the smoke bar, the smoke bar top module can move along with the hanging hooks in the movement direction of the hanging hooks up to an end stop ahead of a deflection radius, wherein a new smoke bar can be pushed into the smoke bar top module at this point so that said smoke bar will then be moved again together with the smoke bar top module and in a direction that is opposite to the movement direction of the input hooks in order to take over a subsequent sausage group.

It is therefore possible that the smoke bar top module inserted once will remain in the hanging device if multiple sausage groups are extracted successively.

In one example, sausage groups may be extracted on the front and back side of the hanging device, wherein a respective smoke bar is guided on a smoke bar top module on the front and back side of the hanging device or wherein the smoke bar is guided itself in the hook guidings in this case.

In one example, the smoke bar top module is formed flexibly, in particular of an elastic material in such a way that the circulation of the smoke bar top module around the hook deflection is possible. However, at least its point is formed flexibly. Hence, the smoke bar can be inserted easily and it can be avoided that sausages are damaged in case of collision. But it is also possible that the smoke bar top module comprises multiple chain segments that are connected flexibly to one another in the axial direction. This means that the individual chain segments can be moved around an axis that extends essentially perpendicularly to the conveying direction of the hanging hooks. Hence, also the circulation of the smoke bar top module around the hook deflection is possible.

BRIEF DESCRIPTION OF THE FIGURES

In the following, the present disclosure will be explained in greater detail with reference to the following Figures.

DETAILED DESCRIPTION

FIGS. 1-14 show the relative positioning of various components of the safety closure and container. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
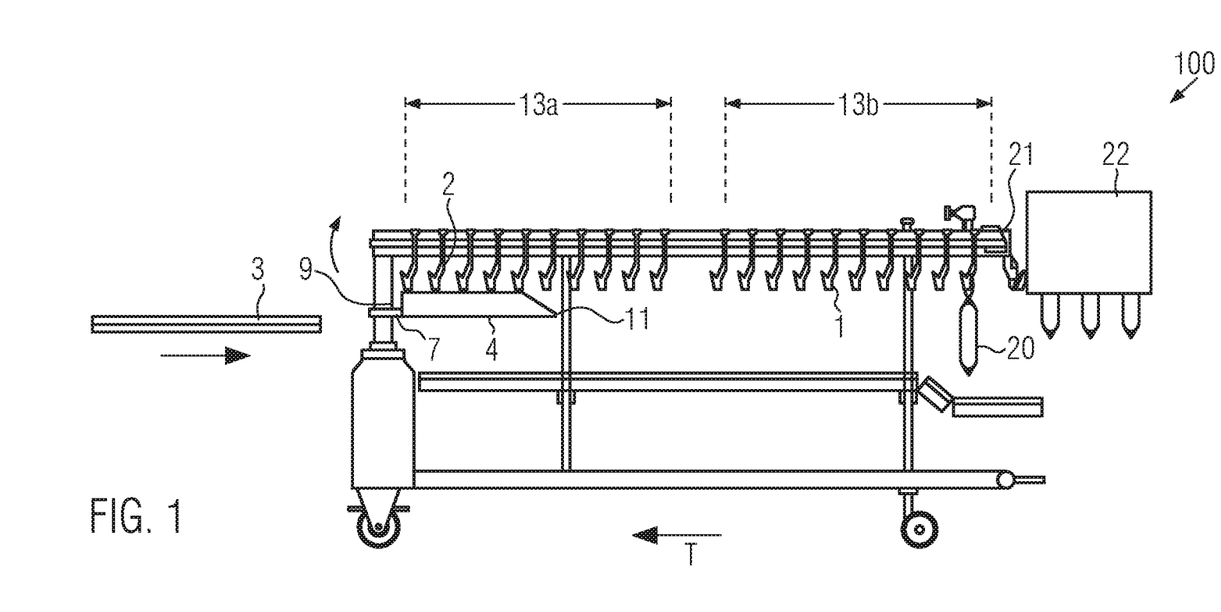
FIG. 1 shows a side view of a hanging device according to the present disclosure in a roughly schematic manner.

FIG. 1 shows a hanging device 100 according to the present disclosure. As can be seen in FIG. 1, the hanging device comprises several hanging hooks 1, also referred to herein as input hooks, that run on a closed circulation track. The hanging hooks may be arranged in parallel to one another and the circulation track extends for example in an essentially horizontal way. The hanging hooks 1 are used to input sausages and/or sausage loops in the area of a handover position 21 and to transport them in the transport direction T, i.e. in the circulating direction of the hanging hooks 1, into one or multiple extraction areas. The extraction area is the area in which the hanging hooks 1 are disposed for extraction of the sausages by a smoke bar 3. In this process, the sausages are hanging for example in sausage loops over the hooks. In this context, a sausage loop can either be understood as a loop that was installed on a sausage 20 or on multiple sausages by a loop maker (FIG. 2C) or rather loops that are formed by sausage chains that are available in a loop form (individual sausages in a row, connected to one another at turn-off points) (see for example FIG. 2A for this purpose). In this application, a loop shall also be understood as a situation in which at least two sausages 20 are input on the hanging hook 1 on their dividing and/or turn-off point.

In the front area of the hanging device 100, a hanging hook 1 threads at the handover position 21 into the dividing point between two portions of a sausage loop that is transported to this point by a transport device 22 coming from a filling machine, takes up said sausage loop and transports it further in the transport direction T. Here, the hanging hooks 1 are arranged on a circulating drive segment, for example in form of a drive belt or a drive chain that can respectively be driven by an engine. In this context, different sausage groups 13a, 13b, 13c, 13d, 13e can be extracted from a predetermined number of hooks with a smoke bar 3 out of the input device 100.

Figure 14:
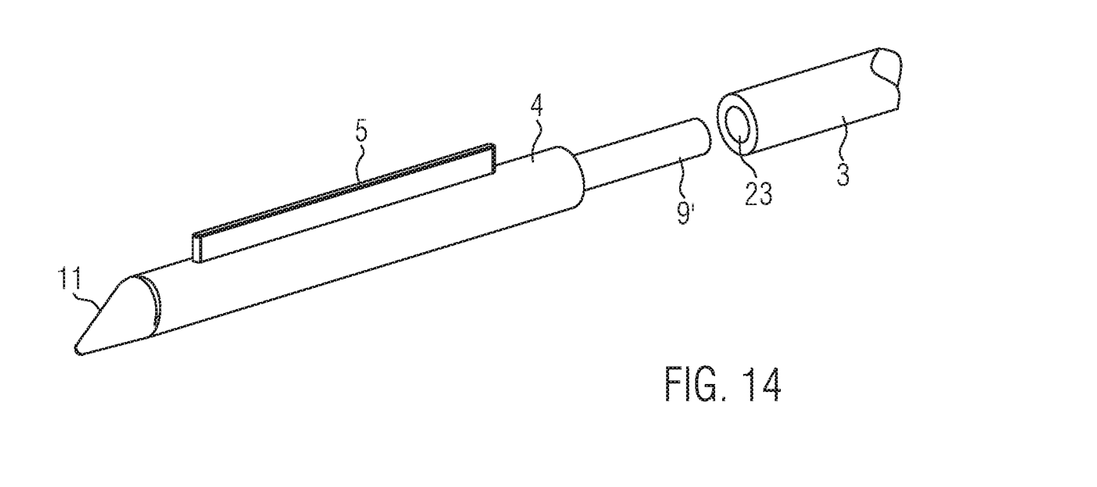
FIG. 14 shows a perspective view of a further embodiment of a possible connecting device of a smoke bar top module according to the present disclosure.

According to a first embodiment, the hanging device comprises hanging hooks 1 that have a guiding device 2a for guiding of the smoke bar 3 or of a smoke bar top module 4 against the movement direction T of the hanging hooks 1. According to a first embodiment, the device comprises a smoke bar top module 4 that also has a guiding device 2b, 5, 6 and that is explained in greater detail in particular in connection with FIGS. 4A-4C, wherein the guiding devices 2a, b jointly form a guiding system 2. The smoke bar top module 4 has a base body 24 that has a recess 9 on its rear that has a diameter that is larger than the diameter or diameter of the perimeter of the smoke bar in such a way that a smoke bar 3 can be pushed easily into the recess and mounted 9 in the recess 9. However, the smoke bar top module can alternatively also have a protrusion 9' as a connecting device as shown in FIG. 14, wherein an opening 23 in the smoke bar 3 or a contact part on the smoke bar can be pushed onto the protrusion 9' in such a way that the smoke bar is connected to the smoke bar top module 4 and that it can be de-coupled again by being simply moved away from the smoke bar top module 4 in the same way as it is also the case in the embodiment in FIG. 4A. The smoke bar top module 4 further comprises a point 11, here an eccentric point, that tapers conically. Through a rotary mechanism, the position of the point can be adjusted in relation to the center of the sausage loops. For this purpose, the point can be made as a separate part that can be inserted in the base body 24 in a way that it can be rotated and fastened. The point can be made of a flexible material that adapts to the loop opening during operation in such a way that the sausages, which are possibly hit by the point, remain intact. On its upper area, the base body 24 also has a guiding device 2b, here in form of a longishly extending protrusion 5. The upward extending protrusion tapers in a pointy way towards the front and the rear and can therefore thread easily into the guiding devices 2a of the hooks.

Figure 4A:
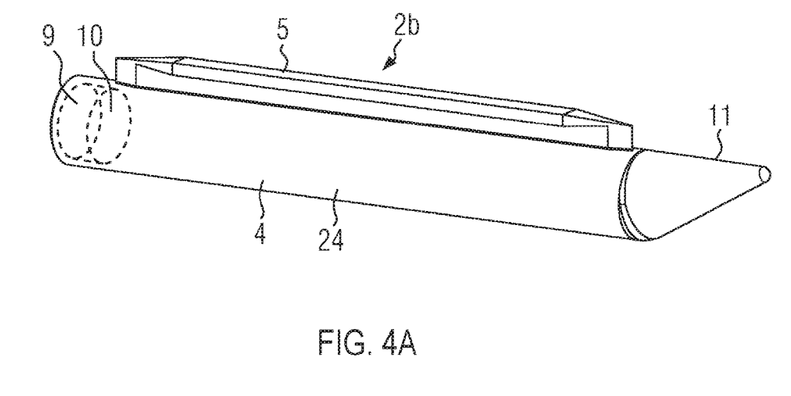
FIG. 4A shows a perspective view of a smoke bar top module according to the present disclosure.
Figure 4B:
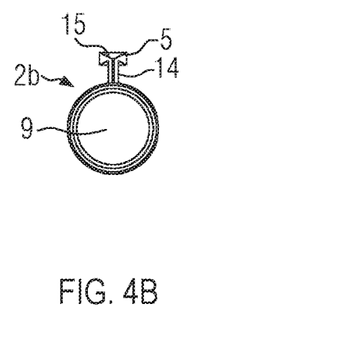
FIG. 4B shows the smoke bar top module that is shown in FIG. 4A in a view from behind.
Figure 5A:
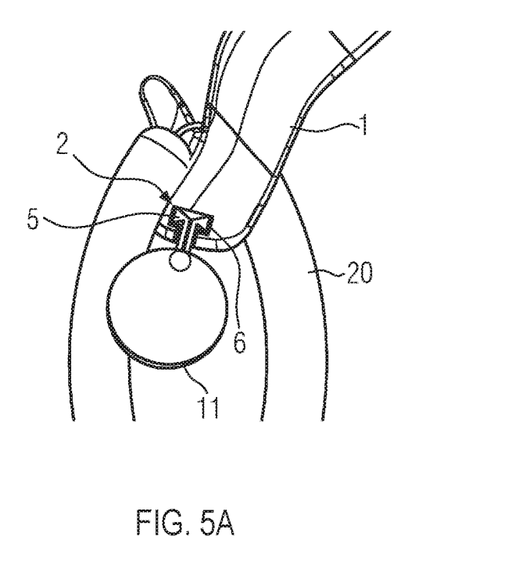
FIG. 5A shows a perspective view of a smoke bar top module, which is held and guided in the loop, in a front view according to the present disclosure.
Figure 5B:
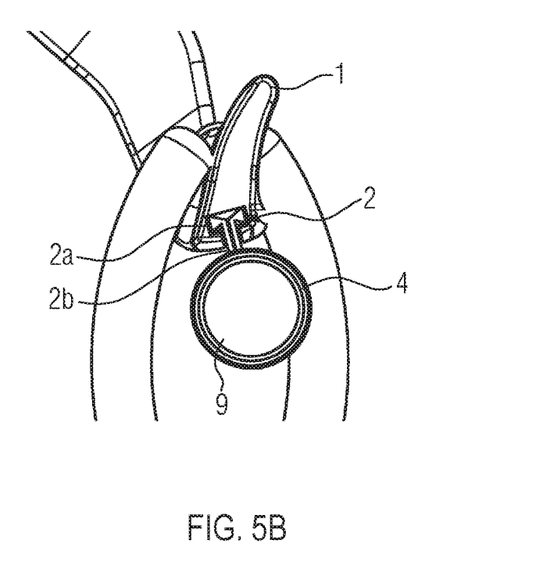
FIG. 5B shows the smoke bar top module shown in FIG. 5A from behind.
Figure 6:
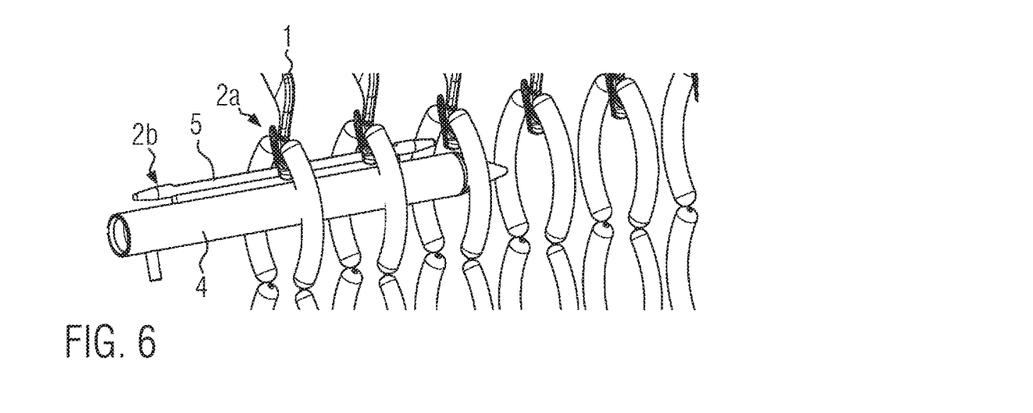
FIG. 6 shows a perspective view of a smoke bar top module that is inserted into the hanging hooks according to the present disclosure.

FIG. 4B shows a view of the smoke bar top module 4 from behind. Here, the recess 9 and the guiding device 2b can be seen even better. The guiding device 2b comprises the protrusion 5 that is formed in a T-shaped way in the cross-section. The rail-like protrusion can run in the guiding device 2a that is formed as a recess 6 in the respective hook 1. Here, the recess 6 has a contour that is complementary to the protrusion 5. The guiding contour 5 can therefore be threaded into the guiding groove 6 of the hooks, as can be seen in particular in FIG. 6, in such a way that the smoke bar top module 4 is guided through the guiding device 2 in the axial direction and carried by the form of the guiding contour 5. As the protrusion 5 and/or the guiding contour 5 has guiding areas that extend laterally to the guiding direction, the smoke bar top module 4 is carried safely in the groove. In this context, the guiding contour 5 and/or the protrusion 5 can be moved axially in the guiding groove 6. Once inserted into the input device 100, the smoke bar top module 4 can remain in this device. During inserting the smoke bar top module 4 as shown in FIG. 6, an end stop 7, which will be explained in greater detail in the following, can be deactivated, for example folded away. The smoke bar top module can also be inserted in the guiding of the hooks on the side that is opposite to the end stop in the transport direction.

Figures 7A, 7B, 7C:
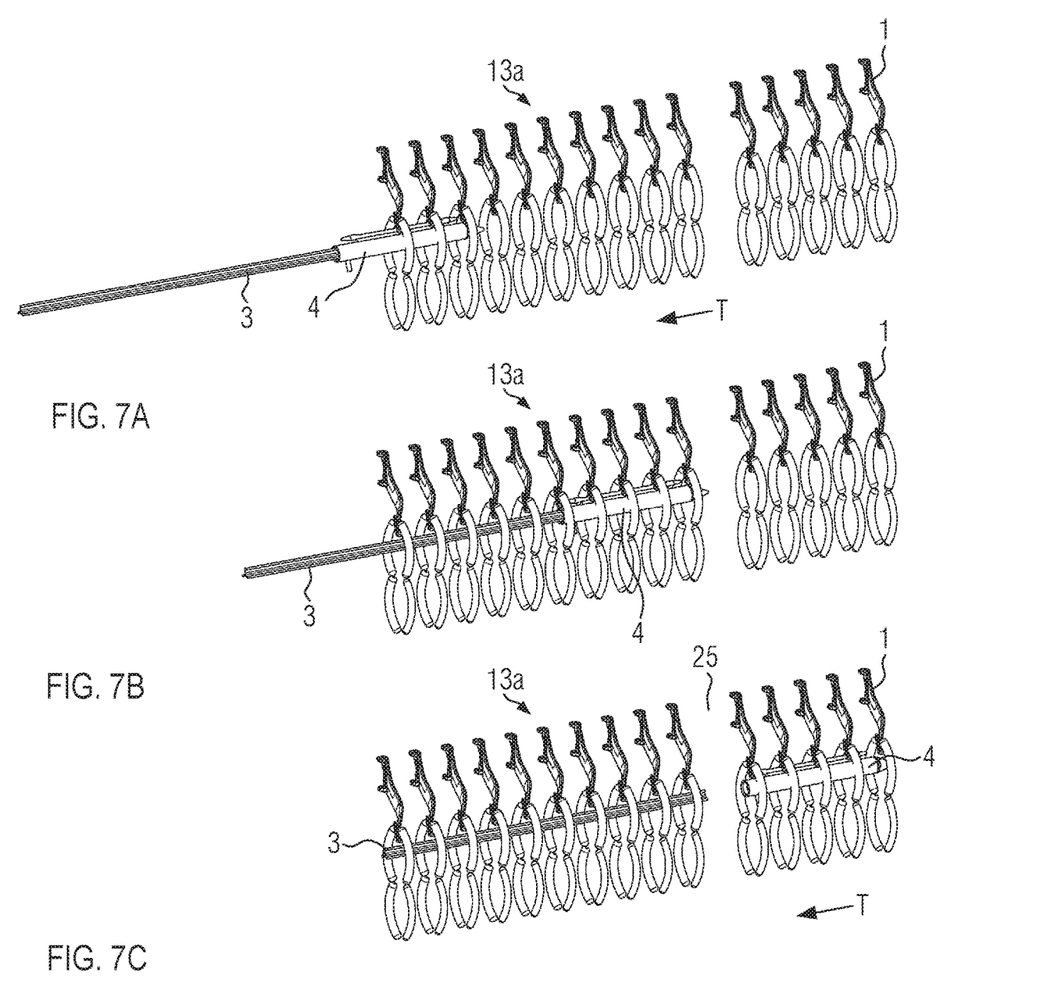
FIG. 7A shows an example step of the process of inserting of a smoke bar together with a smoke bar top module according to at least one embodiment of the present disclosure.
FIG. 7B shows another example step of the process of inserting of a smoke bar together with a smoke bar top module according to at least one embodiment of the present disclosure.
FIG. 7C shows a further example step of the process of inserting smoke bar together with a smoke bar top module according to at least one embodiment of the present disclosure.

As shown in FIGS. 7A, 7B and 7C, a smoke bar 3 can then be connected to the smoke bar top module 4 through the connecting device, here the recess 9, wherein the smoke bar can be guided through the loops (FIG. 7B) together with the smoke bar top module 4 against the movement direction T of the hooks 1 in this case, wherein the smoke bar 3 is guided as far as to protrude beyond the end 25 of a sausage group 13a with a predetermined number of input hooks 1. The smoke bar 3 loaded with sausages can then be extracted from the hanging device 100 as will be described in even greater detail in the following.

Figures 8A, 8B:
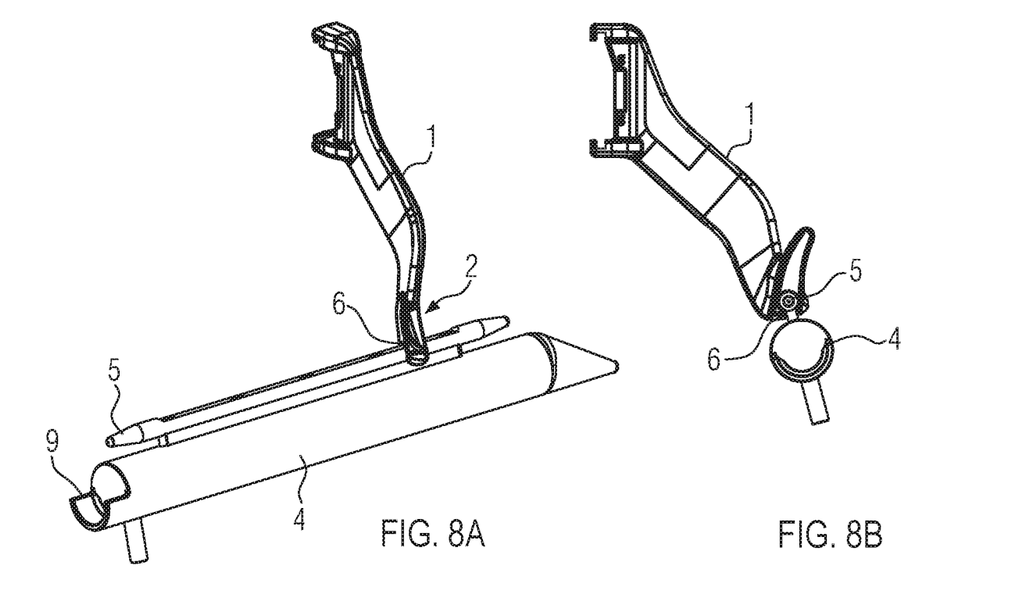
FIG. 8A shows a perspective illustration of a smoke bar top module on a hanging hook with a half shell according to the present disclosure.
FIG. 8B shows a view from behind of the embodiment shown in FIG. 8A.

FIGS. 8A and 8B show a special embodiment according to the present disclosure. Here, the guiding device 2b has a cylindrical protrusion 5 and/or a guiding contour that is cylindrical in the cross section and that is integrated in a respective complementary groove. The cylindrical guiding comes with the advantage that the smoke bar top module 4 can align vertically due to its tare weight and hence adjusts itself independently to the loop center. The recess 9 is formed as a partial shell in this case, here for example as a half shell, and open to the top and to the side. Hence, the smoke bar 3 can be extracted from the recess 9 by simply being lifted off to the top and does not have to be moved and pulled out against the transport direction of the hanging hooks 1.

Figures 9A, 9B:
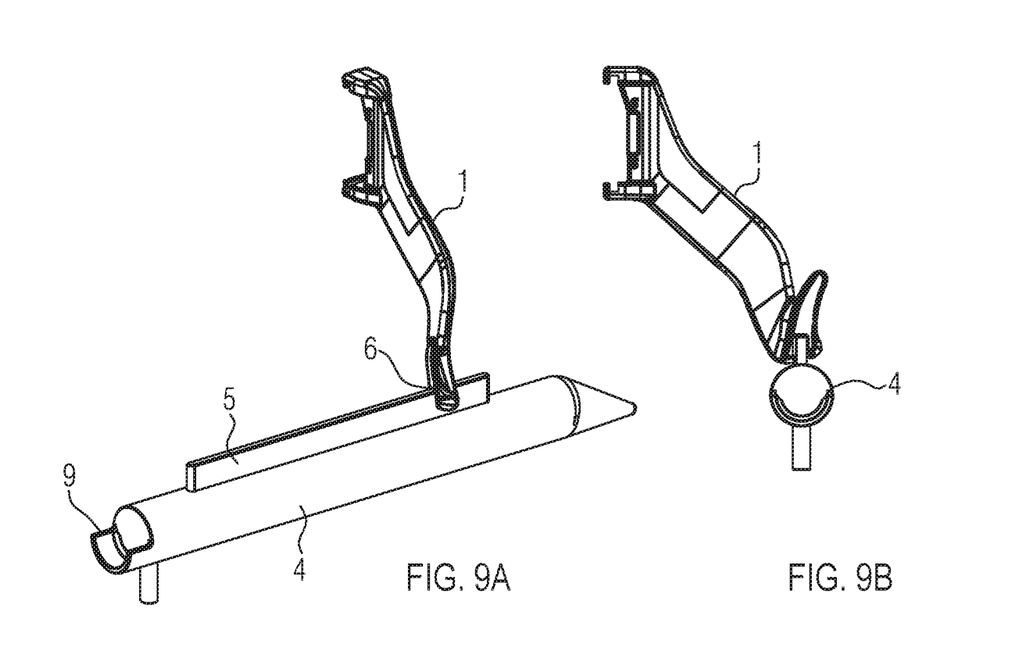
FIG. 9A shows a perspective illustration of a smoke bar top module according to a further embodiment of the present disclosure.
FIG. 9B shows the embodiment shown in FIG. 9A from behind.
Figure 10A:
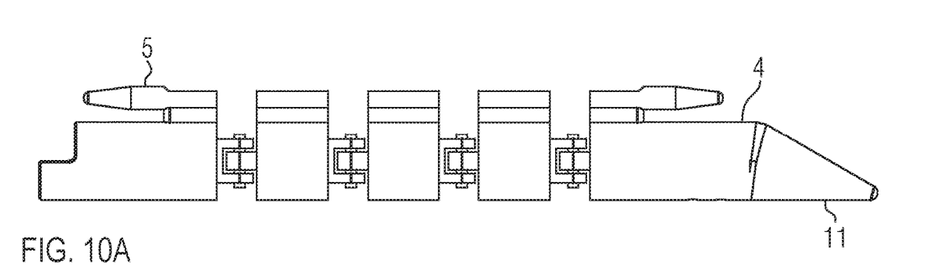
FIG. 10A shows a further embodiment of a smoke bar top module with multiple chain segments according to the present disclosure.
Figure 10B:
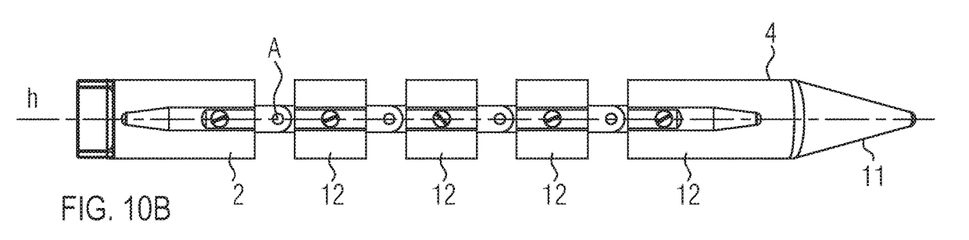
FIG. 10B shows a top view of the embodiment shown in FIG. 10A.

FIGS. 9A and 9B show a further possible embodiment of a smoke bar top module, wherein the guiding device 2b has a longishly extending protrusion 5 that has for example an essentially rectangular cross-section. The guiding groove has an appropriate complementary form. A respective groove is used exclusively for guiding. The smoke bar top module 4 can be held for example by means of magnetic force, for example due to the hook at least in the area of the guiding devices 2a or rather the guiding devices 2b being formed magnetically. As described before, the smoke bar top module 4 can be formed at least on its point 11 of a flexible material, e.g. of an elastomer. But it is also possible that the smoke bar top module 4 is formed of multiple chain segments 12 that are connected flexibly to one another in the axial direction and that are connected to one another in a way that they can be moved around an axis A that is perpendicular to the central axis M as can be seen in particular in the FIGS. 10 A and 10B. Due to this flexible design of the smoke bar top module, it is possible that said module can be guided around the deflection radius 8 of the hook guiding track.

Figure 11A:
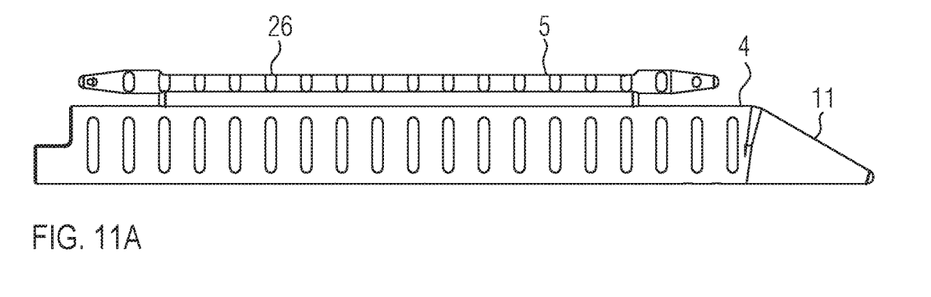
FIG. 11A shows a further embodiment of a smoke bar top module according to the present disclosure.
Figure 11B:
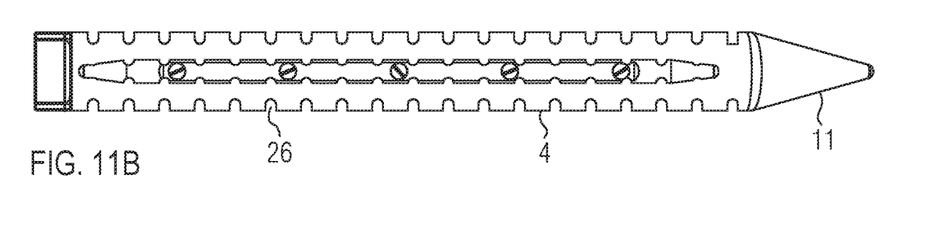
FIG. 11B shows a top view onto the embodiment shown in FIG. 11A.

FIGS. 11A and 11B show a further embodiment according to the present disclosure that essentially corresponds to the smoke bar top module as it is shown in FIGS. 8A and 8B. This smoke bar top module has multiple notches 26 in the lateral area and also in the area of the guiding contour and/or of the protrusion 5. The recesses 26 are used to design the smoke bar top module flexibly in a similar way as in the embodiment according to FIGS. 10A and 10B but in a more hygienically favorable form. If a flexible smoke bar top module is used, the end stop 7 can be omitted.

FIGS. 12A-12C and 13 show a further embodiment according to the present disclosure. Here, the hooks have, just like in case of the previous embodiments, guiding devices 2a,5,6, here for example in form of grooves, with the exception that not a smoke bar top module 4 is guided in the guiding device 2a of the hanging hooks 1 in this case but the smoke bar and/or a guiding device 2b of the smoke bar itself. In the embodiment shown in FIGS. 12A, 12B, and 12C, the smoke bar has a star-shaped cross-section, wherein the external end areas of the outward-extending arms 26 have a rounded widening 27. The guiding groove is open to the bottom and for example wider than the rounded widening 27 of the smoke bar.

Figure 12A:
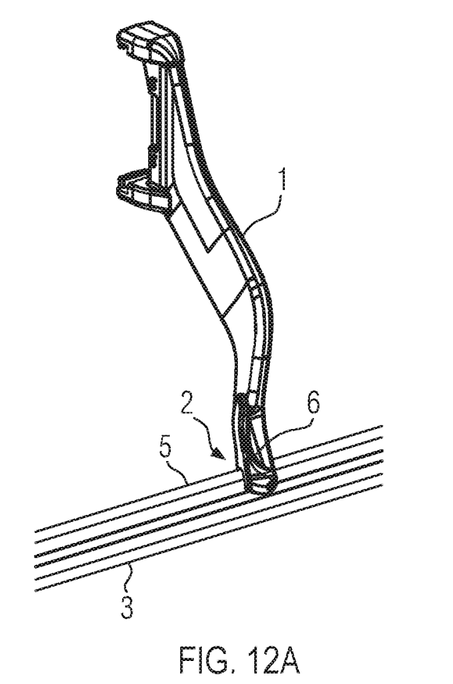
FIG. 12A shows a further embodiment according to the present disclosure in which the smoke bar is guided itself in the guiding device of the input hooks.
Figure 12B:
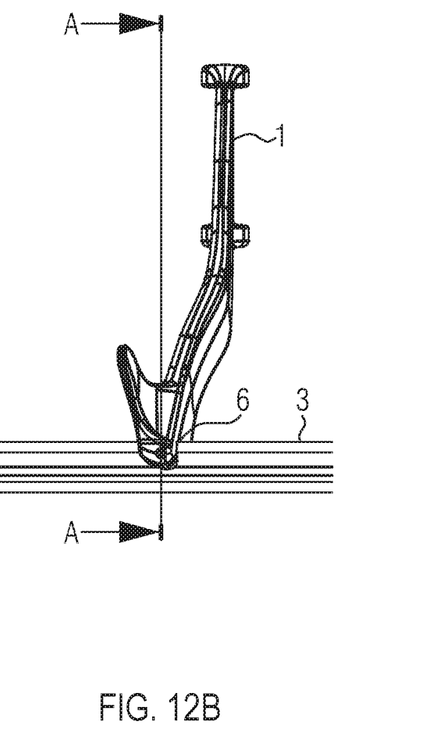
FIG. 12B shows a side view of the embodiment shown in FIG. 12A.
Figure 12C:
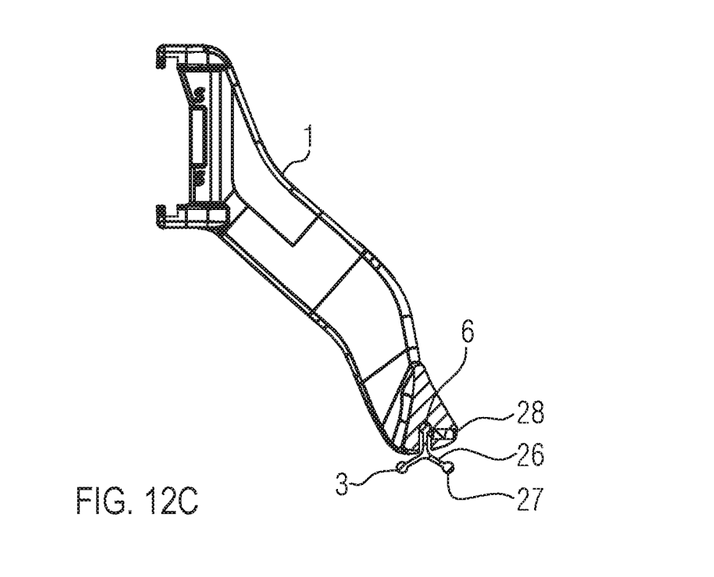
FIG. 12C shows a section along the line A-A of FIG. 12B.

As can in particular be seen in FIG. 12a-12c, the arm 26 with the widening 27 is inserted in a groove in the hanging hook 1. In order for the smoke bar to be held in the guiding, for example a spring 28 can be provided that comprises the arm and/or the widening 27 at least partially in order to counteract the weight force of the smoke bar. To remove the smoke bar from the guiding, said smoke bar can simply be pulled out in a downward direction after overcoming the spring force. Alternatively, the smoke bar can also be held with magnetic force if at least the section that bears the guiding groove 6 is formed magnetically.

Figure 13A:
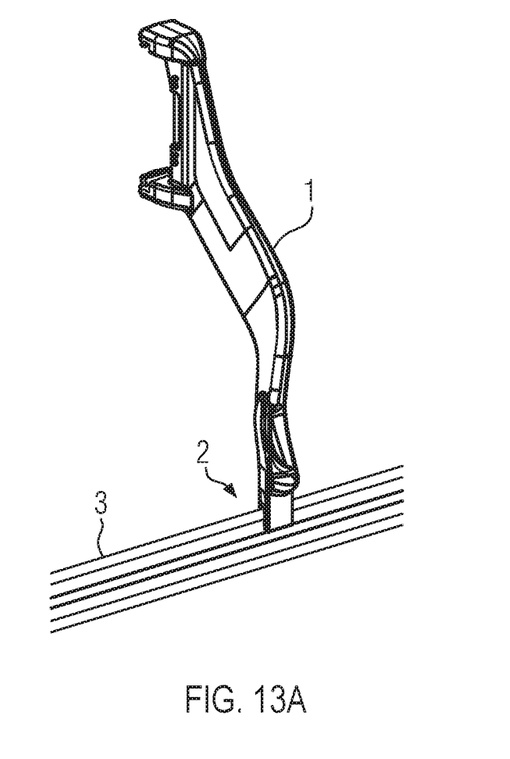
FIG. 13A shows a further embodiment in which the smoke bar is guided itself in the guiding device of the input hook in a perspective illustration.
Figure 13B:
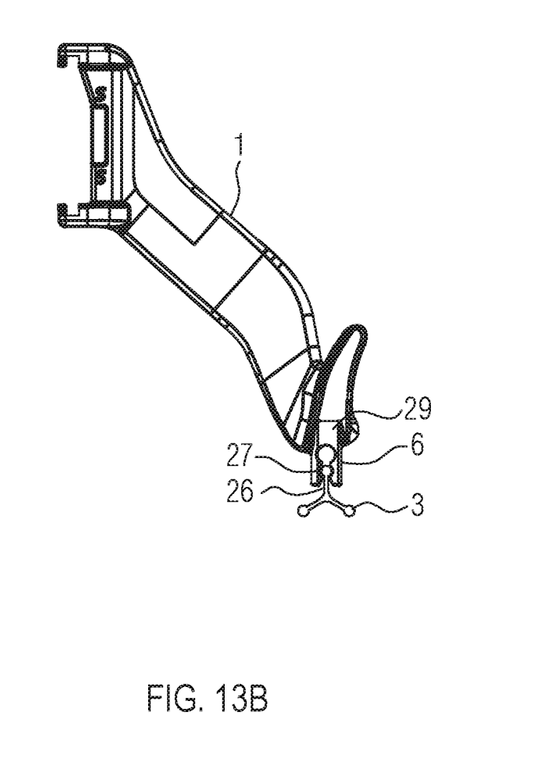
FIG. 13B shows a cross-section through the smoke bar and input hook shown in FIG. 13A according to the present disclosure.

A further embodiment for guiding the smoke bar 3 is shown in FIGS. 13A and 13B, in which the arm 26 with the widening 27 is inserted in a pressure piece 29 with a respective guiding groove 6. The contour of the recess 6 is adapted to the contour of the guiding section of the smoke bar. The pressure piece 29 is formed flexibly, wherein the smoke bar is fastened in the pressure piece 29 so that the smoke bar cannot fall out to the bottom. For extraction of the smoke bar, the smoke bar is simply pulled out of the flexible pressure piece 29 to the bottom. Also without using a smoke bar top module, the smoke bar can be threaded into the first hook of a group of hooks according to the embodiments shown in FIGS. 12-13 and then be displaced axially against the movement direction T, wherein the smoke bar is then inserted automatically in the grooves 6 of the subsequent hooks 1. Hence, there will be the same advantages as in case of the embodiment in which the smoke bar top module runs in the guiding device 2a of the hanging hooks 1.

In the following, the method according to the present disclosure will be explained in greater detail with reference to the FIGS. 1, 6, 7A, and 7B.

At first and as shown in FIG. 6, the smoke bar top module 4 is inserted with its guiding device 2b into the guiding device 2a of the hanging hooks 1 against the transport direction T, wherein the longish guiding protrusion 5 is inserted in the respectively formed grooves 6 of the hanging hooks 1. This can take place either when there are already sausages on the hook 1 or rather prior to production. Inserting and/or extraction of the smoke bar top module 4 is only possible in the area of the deflection radius 8, i.e. where the deflection radius starts, as indicated in FIG. 3 by the reference sign 8'. During inserting of the smoke bar top module 4, the end stop 7 can be deactivated or the smoke bar top module is inserted at the beginning of the deflection radius 8, where the hooks spread out due to the circular movement, or on the point that is located opposite to the end stop.

To input a sausage group, the smoke bar 3 can now be docked with its front end on the rear end of the smoke bar top module 4, i.e. may be inserted in the recess 9 for example up to an end stop 10 (see FIG. 4A) as it is shown in FIGS. 7A and 7B. Therefore, the smoke bar is already mounted and held in the smoke bar top module 4 in a one-sided way on its end that faces away from the operator. If the operator moves the smoke bar 3 in a direction that is opposite to the transport direction T as can be taken from FIGS. 7A and 7B, the smoke bar 3 and the smoke bar top module 4 will move jointly in the axial direction through the sausage loops. The smoke bar is moved until its front end, i.e. the end that faces away from the operator, is located outside of an end 25 of the sausage group 13a. The smoke bar top module 4 is thereby already located in the area of the next sausage group. The groups can for example be spaced from one another, wherein one or multiple hooks have been removed between the sausage groups. Then, the end of the sausage group can be detected well by the operator. Alternatively, it is also possible to use an optical display device that indicates the end of a sausage group.

To extract the smoke bar 3, the smoke bar 3 can now for example be moved back in the transport direction T in such a way that it is decoupled from the smoke bar top module 4. Subsequently, the operator can lift off the smoke bar towards the side or the top in such a way that the smoke bar loaded with sausages can be taken out of the hanging device 100.

The smoke bar top module 4 subsequently moves along with the hanging hooks 1, which move in the transport direction T, until the smoke bar top module 4 hits an end stop 7 (FIG. 1, FIG. 3) and rests in this end position that is located ahead of the deflection radius 8. Then, the next smoke bar 3 can, for the takeover of the next group 13*b*, be docked on the smoke bar top module 4 for the extraction of the next sausage group.

For the extraction of the smoke bar, it was described in advance that the smoke bar 3, as can be seen in FIG. 7C, is moved back out of the recess in the transport direction T. Alternatively, it is also possible, as described above, to form the recess 9 for example as a half shell or a partial shell in such a way that the smoke bar can be extracted from the recess 9 to the side and/or to the top without a relative axial movement between the smoke bar and the smoke bar top module 4.

As shown in FIG. 3, it is also possible that the sausage groups 13 are extracted by a smoke bar 3 from two sides that are located opposite to one another. Then, it is advantageous if a respective smoke bar top module 4 is provided for example both on the front side as well as on the back side. The extraction from two opposite sides is also possible with the embodiment according to FIGS. 13A and 13B.

Figure 15:
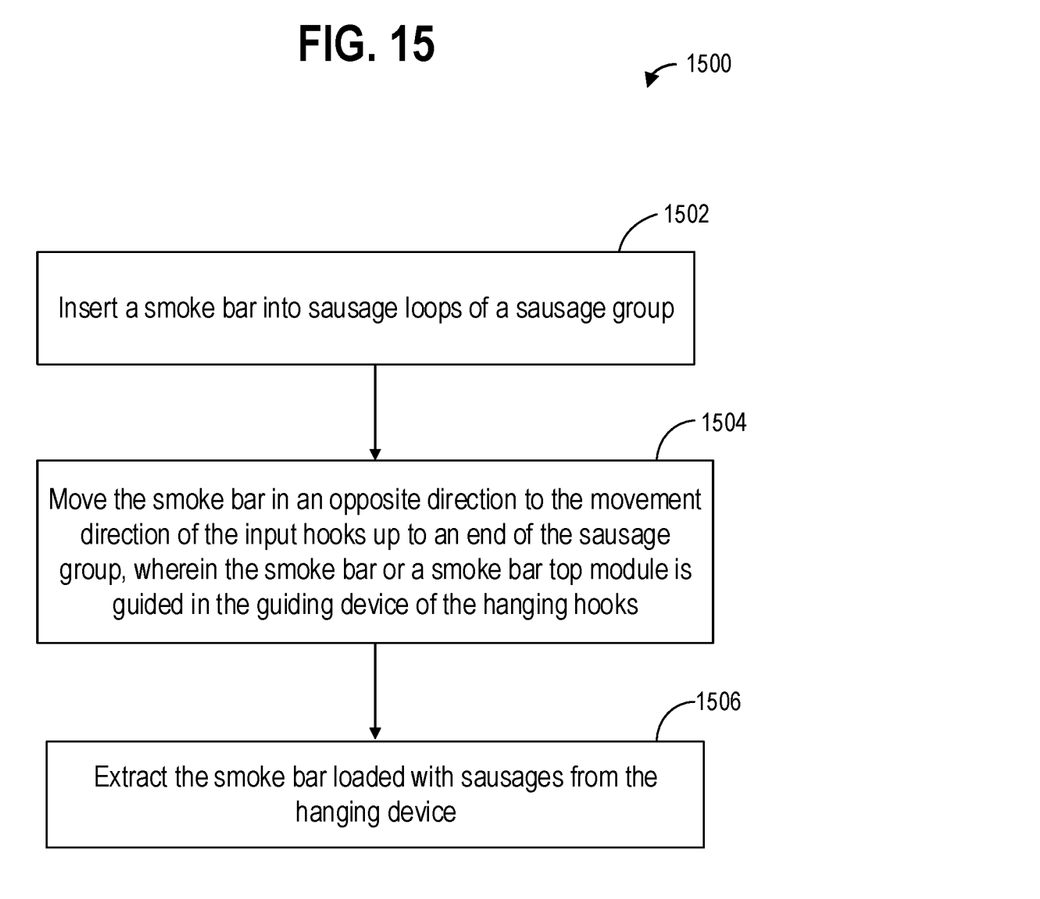
FIG. 15 shows a flow chart of an example method according to at least one embodiment of the present disclosure.

Turning to FIG. 15, a flow chart of an example method 1500 according to at least one embodiment of the present disclosure is shown. Method 1500 may be a method for extracting a sausage group that hangs on multiple input hooks of a hanging device, where the hanging device is for hanging sausages, including sausage chains, with multiple circulating hanging hooks, and wherein the hanging hooks have a guiding device for guiding a smoke bar or a smoke bar top module against a movement direction (T) of the hanging hooks. For example, in at least one embodiment, hanging device 100 may be the hanging device of method 1500.

At step 1502, method 1500 may include inserting a smoke bar into sausage loops of a sausage group. Method 1500 may then include moving the smoke bar in an opposite direction to the movement direction (T) of the input hooks up to an end of the sausage group, wherein the smoke bar or a smoke bar top module is guided in the guiding device of the hanging hooks at step 1504.

Method 1500 may further comprise extracting the smoke bar loaded with sausages from the hanging device at step 1506. In at least one example, method 1500 may include inserting a smoke bar top module in the guiding devices of the input hooks, inserting the smoke bar in the connecting device of the smoke bar top module, where the smoke bar pushes the smoke bar top module against the movement direction (T) of the input hooks beyond the end of the sausage group to be input, and subsequently extracting the smoke bar loaded with sausages.

Moreover, in at least one example, method 1500 may include, prior to the extraction of the smoke bar loaded with sausages, moving the smoke bar away from the smoke bar top module in the movement direction (T) of the input hooks or moved out of an opening in a lateral and/or an upper area of the connecting device. In at least one example, method 1500 may include, after extraction of the smoke bar, moving the smoke bar top module in the movement direction of the hanging hooks along with the hanging hooks up to an end stop ahead of a deflection radius where a new smoke bar is pushed into the smoke bar top module that is moved together with the smoke bar against the movement direction (T) of the input hooks in order to take over a subsequent sausage group. Additionally or alternatively, method 1500 may include wherein the smoke bar top module inserted remains in the hanging device when multiple sausage groups are extracted successively. In a further example, method 1500 may include wherein sausage groups are extracted on the front and back side of the hanging device, and wherein a respective smoke bar is guided on a smoke bar top module or in the guiding of the hanging hook on the front and back side of the hanging device.

It is also possible to automate the aforementioned process by means of driving the smoke bar 3 into the sausage loops via a so-called mechanical smoke bar insert and/or together with the smoke bar top module 4 after which said smoke bar can be extracted for example by a robot.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or proper-ties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hanging device for hanging sausages, including sausage chains, with multiple circulating hanging hooks,
    wherein the hanging hooks have a guiding device for guiding a smoke bar or a smoke bar top module against a movement direction (T) of the hanging hooks.

2. The hanging device according to claim 1, wherein the guiding devices are formed in such a way that the smoke bar or the smoke bar top module is mounted in the guiding devices in a way that is moved axially.

3. The hanging device of claim 2, wherein the guiding devices of the hanging hooks comprise a groove in which a protrusion of the smoke bar or of the smoke bar top module runs.

4. The hanging device of claim 3, wherein the guiding devices of the hanging hooks comprise a protrusion that runs in a groove in the smoke bar or smoke bar top module.

5. The hanging device according to claim 1, wherein the smoke bar or the smoke bar top module is held by the guiding devices.

6. The hanging device according to claim 5, wherein the smoke bar or the smoke bar top module is held by the guiding devices by means of magnetic force, by a contour of the guiding devices, by a pressure piece, or by a spring element.

7. The hanging device according to claim 1, wherein the hanging device has at least one end stop that stops the smoke bar top module prior to a start of a deflection radius.

8. A method for extracting a sausage group that hangs on multiple hanging hooks of a hanging device, where the hanging device is for hanging sausages, including sausage chains, with multiple circulating hanging hooks, and wherein the hanging hooks have a guiding device for guiding a smoke bar or a smoke bar top module against a movement direction (T) of the hanging hooks, comprising the following steps:
    inserting a smoke bar into sausage loops of a sausage group;

moving the smoke bar in an opposite direction to the movement direction (T) of the hanging hooks up to an end of the sausage group, wherein the smoke bar or the smoke bar top module is guided in the guiding device of the hanging hooks; and extracting the smoke bar loaded with sausages from the hanging device.

9. The method according to claim 8, further comprising:

inserting the smoke bar top module in the guiding device of the hanging hooks, inserting the smoke bar in the connecting device of the smoke bar top module, where the smoke bar pushes the smoke bar top module against the movement direction (T) of the hanging hooks beyond the end of the sausage group to be input; and subsequently extracting the smoke bar loaded with sausages.

10. The method according to claim 9, wherein prior to the extraction of the smoke bar loaded with sausages, the smoke bar is moved away from the smoke bar top module in the movement direction (T) of the hanging hooks or moved out of an opening in a lateral and/or an upper area of the connecting device.

11. The method according to claim 8, wherein after extraction of the smoke bar, the smoke bar top module moves in the movement direction (T) of the hanging hooks along with the hanging hooks up to an end stop ahead of a deflection radius where a new smoke bar is pushed into the smoke bar top module that is moved together with the smoke bar against the movement direction (T) of the hanging hooks in order to take over a subsequent sausage group.

12. The method according to claim 8, wherein the smoke bar top module inserted remains in the hanging device when multiple sausage groups are extracted successively.

13. The method according to claim 8, wherein sausage groups are extracted on a front and back side of the hanging device, and wherein a respective smoke bar is guided on a smoke bar top module or in the guiding of the hanging hook on the front and back side of the hanging device.

\* \* \* \* \*